United States Patent

Boggs

[15] 3,688,683
[45] Sept. 5, 1972

[54] SAFETY CONTROLS FOR DEEP FAT FRYERS

[72] Inventor: Weldon C. Boggs, 3031 Helen Ave. P.O. Box 10536, Tampa, Fla. 33609

[22] Filed: May 28, 1970

[21] Appl. No.: 41,327

[52] U.S. Cl. .....................99/330, 99/337, 99/403, 219/331
[51] Int. Cl. ...............................................A47j 37/12
[58] Field of Search........99/337, 330, 403, 407, 408; 219/331

[56] References Cited

UNITED STATES PATENTS

| | | |
|---|---|---|
| 2,479,587 | 8/1949 | Morris et al. .............219/331 |
| 2,748,243 | 5/1956 | Michaelis ..................219/331 |
| 2,812,254 | 11/1957 | Smith.......................99/330 X |
| 3,107,601 | 10/1963 | Longmire ....................99/330 |
| 3,134,008 | 5/1964 | Finn.......................219/331 X |
| 3,210,193 | 10/1965 | Martin.........................99/330 |
| 3,282,197 | 11/1966 | Smith......................99/407 X |
| 3,410,199 | 12/1968 | Quednau ....................99/403 |
| 3,466,997 | 9/1969 | Hartzog...................99/408 X |
| 3,608,472 | 9/1971 | Pelster.......................99/327 |

FOREIGN PATENTS OR APPLICATIONS 548,699   11/1957   Canada.........................99/330

Primary Examiner—Billy J. Wilhite
Attorney—Bacon & Thomas

[57] ABSTRACT

In a deep fat fryer having a tank for cooking oil containing an electrical heating grid, a safety thermostat switch mechanically connected with the grid by a metallic, thermal cut out clip. The clip is tightly clamped to the grid and to the housing of the thermostat switch to assure rapid heat transfer from the grid to the thermostat. The thermostat switch is connected in an electrical circuit to interrupt flow to the grid in the event that the cooking oil in the heating tank is overheated, or to quickley open the circuit to the grid in the event that no cooking oil, or insufficient cooking oil, is present in the heating tank, A further and primary safety feature consists in mounting a flow-responsive switch in a conduit leading to the heating tank. This switch is connected in the circuit with the heating grid to cut off current in the absence of flow of cooking oil to the heating tank.

6 Claims, 11 Drawing Figures

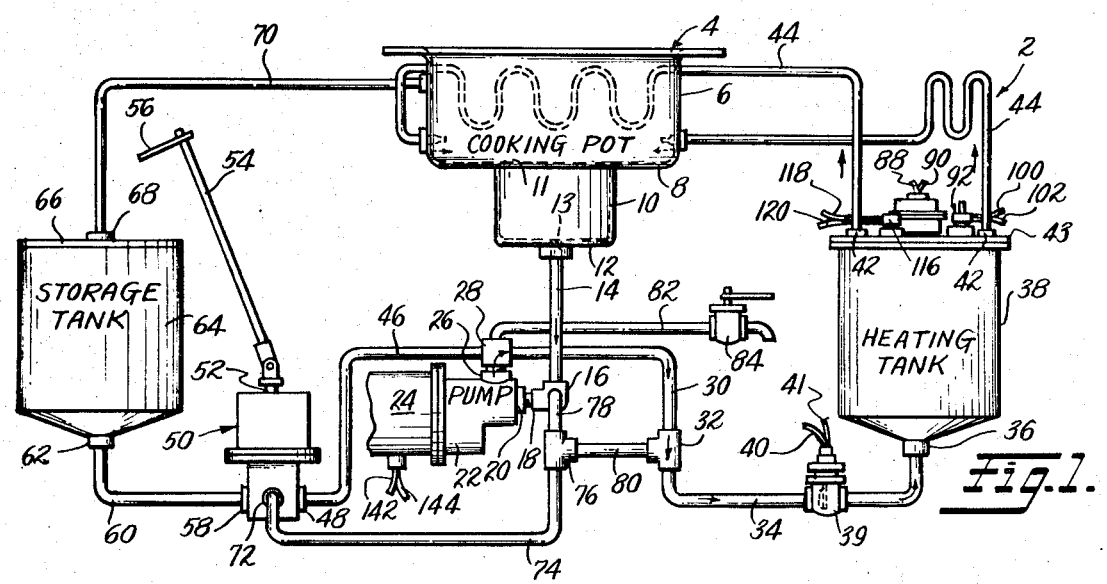

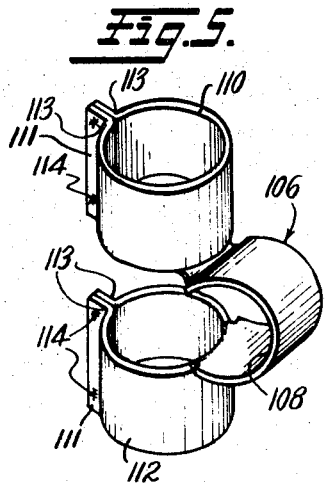
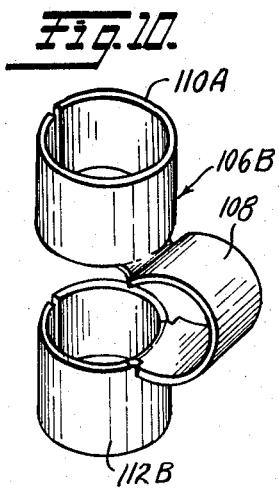
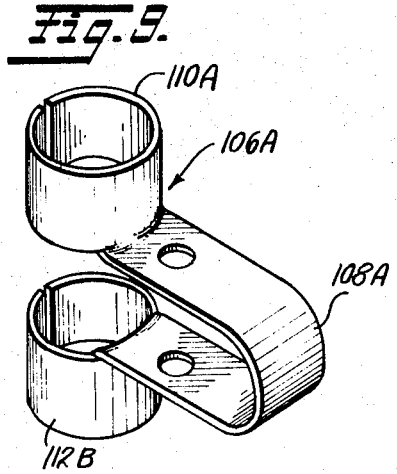
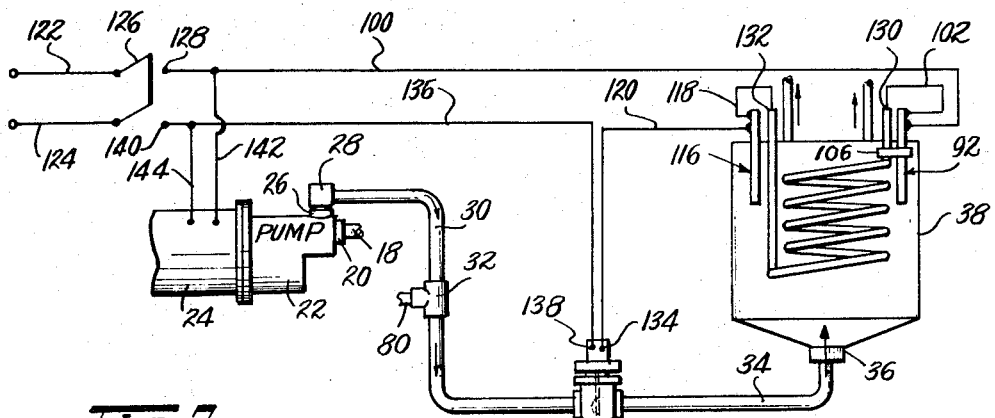
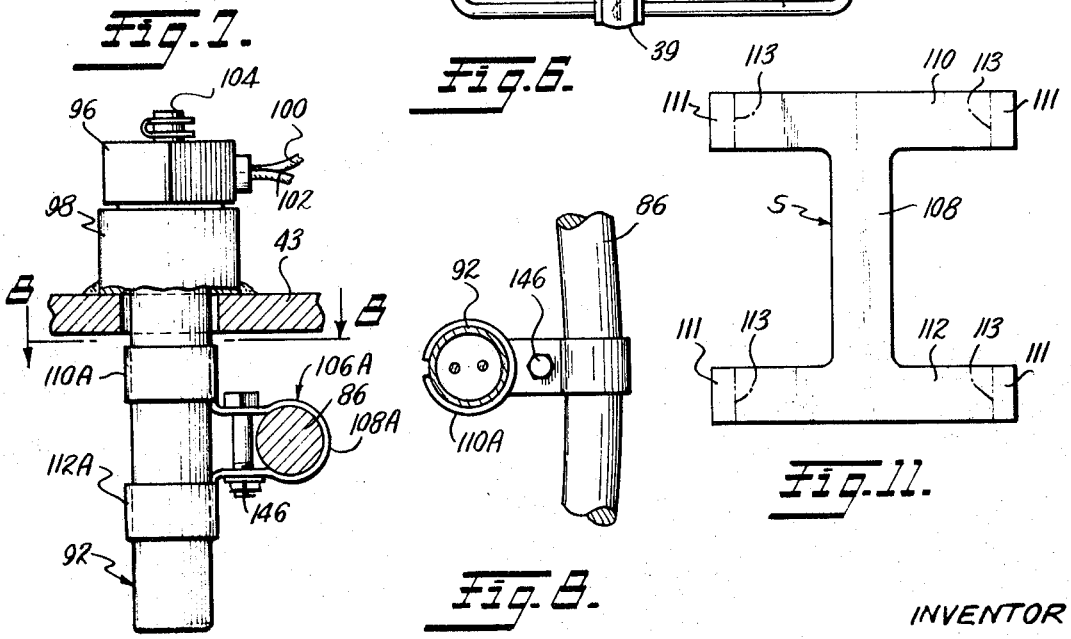

SAFETY CONTROLS FOR DEEP FAT FRYERS

FIELD OF THE INVENTION

The present invention relates to certain improvements in deep fat fryers of the type disclosed in U.S. Pat. No. 3,410,199, which includes a built-in tank for heating the cooking oil. More specifically, the invention relates to a thermostat clip, or thermal cut out clip, for connecting the electrical heating element or grid in the heating tank to the housing of a safety thermostat switch, so that heat from the grid will be conducted directly to the thermostat housing to cut off current to the grid when the set temperature of the thermostat is reached, and before a hazardous condition can be created, for example, by overheating of the oil, or because of lack of oil in the heating tank.

The invention further relates to a flow-responsive safety switch connected in the pipe leading to the inlet of the heating tank. This switch is connected in the circuit with the heating element so that in the absence of the flow of oil to the heating tank, the circuit to the heating element will remain open.

While the use of the thermal cut out clip and the flow-responsive switch will be described herein with respect to a deep fat fryer, it will be understood that both may be employed in any device in which a liquid is heated in a tank.

THE PRIOR ART

A deep fat fryer having a heating tank for cooking oil is disclosed in U.S. Pat. No. 3,410,199. In the patented device, a thermostat safety switch is mounted on the heating tank for interrupting current to the heating grid, or heating element, in the event that the cooking oil in the tank is heated to a temperature higher than the setting of the thermostat. However, if there is no cooking oil in the heater tank, or if the tank is only partly filled, the safety thermostat is slow to respond for the reason that only the air in the heating tank is available to convey heat by convection to operate the thermostat. Since air is a poor conductor of heat, considerable time is required to operate the thermostat, during which the heat from the grid will vaporize the oil on the exposed surfaces of the grid or on the interior of the tank, producing vapors that could possibly create a hazardous condition. Also, in the patented device, even though a safety thermostat switch is provided on the heating tank, no provision is made for preventing the flow of current to the heating element, in the event that no oil is flowing to the heating tank. Situations such as the foregoing, could arise after the cooking oil has been drained from the system for storage or replacement by fresh oil and the operator turns on the heater without refilling, or only partially refilling the system.

SUMMARY OF THE INVENTION

The present invention relates to certain safety improvements in deep fat fryers of the type shown in U.S. Pat. No. 3,410,199. This patent discloses a deep fat fryer including a cooking pot, a storage tank for cooking oil, a heating tank for the cooking oil, a circulating pump, a control valve and a circulating system connected with the pump through which oil is withdrawn from the storage tank and delivered to the heating tank, and then continuously circulated from the heating tank to the cooking pot so long as the apparatus is in operation. The heating tank has one thermostat that controls an electrical heating element in the tank to maintain the oil at a temperature higher than the temperature desired in the cooking pot. The heating tank also has a safety thermostat, set at a higher temperature, for interrupting the supply of current to the heating element in the event that the first thermostat malfunctions and the temperature of the oil in the heating tank exceeds the higher temperature for which the safety thermostat is set.

One of the present improvements consists in providing a resilient thermal cut out, or thermostat clip, for connecting the heating element in the heating tank to the body of the safety thermostat so that heat will be directly conducted from the heating element to the safety thermostat, and thus assure immediate response by the safety thermostat to a condition that could possibly be hazardous. For example, draining the system for the purpose of replacing the oil, and turning the heater on without first refilling the system. In the absence of cooking oil in the heating tank, the heating element merely heats the air in the tank and would vaporize some of the oil on the heating element thereby producing a potential fire hazard. This danger is eliminated by the present clip member, which directly connects the heating element to the safety thermostat. Hence, as the heating element becomes heated, heat is directly conducted through the thermostat clip to the thermostat itself, so that it immediately responds and cuts off the supply of current to the heating element.

The clip member may be made from an H-shaped stamping or blank of stainless steel with the vertical portion of the I bent to provide a U-shaped part for clamping to the heating element, and with the horizontal portions of the I bent to substantially cylindrical shape and disposed at right angles to the U-shaped part for clamping engagement with the safety thermostat. The clip is so designed that it maintains good thermal contact with both the thermostat and the heating element regardless of the expansion or contraction of the thermostat element and/or the heating element. The U-shaped part of the clip can be secured around a convolution of the heating element by a clamping bolt or be held in place by its own resilience. The cylindrical portions of the clip resiliently clamp on the housing of the safety thermostat.

A further improvement consists in providing a flow-responsive switch in the conduit leading to the inlet of the heating tank. This switch is connected in series with the heating element so that in the absence of flow of oil to the heating tank, the circuit to the heating element will remain open.

Accordingly, the principal object of the invention is to provide safety means for a deep fat fryer that will avoid damage to the equipment and avoid creating possible hazardous conditions of operation.

Another object is to provide means that will cause the thermostat in the cooking oil heating tank to immediately cut off the supply of current to the heating element in the tank when no cooking oil, or insufficient cooking oil, is present in the heating tank.

Another object is to provide means for directly interconnecting a heating element and a thermostat so that heat will be directly conducted from the heating element to the thermostat.

Still another object is to provide means that will prevent electrical current from being supplied to a heating element in a heating tank, in the absence of flow to the heating tank of oil or other liquid to be heated.

Other objects and advantages of the invention will be apparent from the following description taken in conjunction with the accompanying drawings.

DESCRIPTION OF THE DRAWINGS

FIG. 1 is a schematic flow of a deep fat fryer embodying the principles and safety features of the present invention;

FIG. 2 is an enlarged view of the heating tank with a portion of the tank wall broken away to show the metallic clip interconnecting the heating element and the thermostat;

FIG. 3 is a fragmentary horizontal sectional view, taken on the line 3—3 of FIG. 2.

FIG. 4 is a fragmentary vertical sectional view, taken on the line 4—4 of FIG. 2;

FIG. 5 is a perspective view of the clip shown in FIGS. 2 to 4;

FIG. 6 is a view schematically illustrating a control circuit for the heating element and including the flow responsive safety switch, and the safety thermostat with the clip interconnecting the thermostat and the heating element;

FIG. 7 is a view similar to FIG. 4, but showing another embodiment of the thermostat clip;

FIG. 8 is a fragmentary horizontal sectional view taken on the line 8—8 of FIG. 7;

FIG. 9 is a perspective view of the thermostat clip shown in FIGS. 7 and 8;

FIG. 10 is a perspective view of still another embodiment of the thermostat clip; and FIG. 11 is a plan view of a sheet metal stamping or blank from which the clip shown in FIG. 5 can be made.

DESCRIPTION OF THE PREFERRED EMBODIMENT

FIG. 1 is a diagramatic view showing the essential elements of a deep fat fryer, which is generally identified by the numeral 2. Normally, these elements would be mounted upon a frame and enclosed in a cabinet, not shown.

The unit 2 comprises a cooking pot 4 having a side wall 6 and a bottom wall 8. A filter-receiving bowl 10 communicates at its upper end with the cooking pot 4 through an opening 11 in the bottom wall. The filter bowl 10 has a bottom wall 12 with an outlet opening 13 to which one end of a pipe 14 is connected. The other end of the pipe 14 is connected to a three-way fitting 16 connected by a pipe nipple 18 with the inlet 20 of a pump 22 driven by a motor 24. The pump 20 has an outlet 26, in which a four-way fitting 28 is mounted. A pipe 30 extends from the fitting 28 to a branch of a pipe-T 32. A pipe 34 connects the other branch of the pipe-T 32 with an inlet 36 at the lower end of the heating tank 38. A flow-responsive switch 39 is connected in the pipe 34, the purpose and function of which will be described in more detail hereinafter. Conductors 40 and 41 are connected with the switch 39.

The heating tank 38 has a cover 43 provided with two outlets 42, each of which is connected by a tube 44 to the cooking pot 4 at a point close to the bottom wall 8.

A pipe 46 interconnects the fitting 28 with a port 48 of a manually operated three way valve 50. The valve 50 includes a stem 52 connected by a rod 54 to an operating handle 56. The valve 50 has a second part 58 that is connected by a pipe 60 to an outlet 62 of a cooking oil storage tank 64. The storage tank 64 has a cover 66 with a vent opening 68. One end of an air vent pipe 70 is connected with the opening 68 and its other end is connected with an opening in the side wall 6 of the cooking pot 4 at a level above the normal level of the cooking oil in the cooking pot 4. The pipe 70 can also serve as an overflow pipe for returning cooking oil to the storage tank 64 if too much oil is introduced into the cooking pot 4.

The valve 50 has a third port 72 to which one end of a pipe 74 is connected. The other end of the pipe 74 is connected to one branch of a pipe-T 76, the other branch of which is connected by a pipe 78 with the fitting 16 mounted in the inlet 20 of the pump 22. A pipe 80 connects the stem of the pipe-T 76 with the stem of the pipe-T 32. A third pipe 82 is connected with the fitting 28 mounted in the outlet 26 of the pump 22 and serves as a drain pipe for the system. The discharge of cooking oil through the drain pipe 82 is controlled by a manually operated drain valve 84.

Referring to FIG. 2, the heating tank 38 has mounted on the cover 43 thereof, an electrical heating element 86 comprising grids having spaced convolutions that are circular in transverse cross-section. Electrical current is supplied to the heating element 86 through conductors 88 and 90, which are connected with terminals (not shown) on the tank cover 43. The heating tank 38 and the heating element 86 thus function as a heating device or heat exchanger: also mounted on the cover 43 is a safety thermostat 92, which comprises a cylindrical housing or body portion having threads 94 at its upper end, above which is an hexagonal head 96 for mounting the thermostat in a threaded boss 98 welded to the cover 43. The body of the thermostat 92 is disposed vertically and extends downwardly within and to a point below and adjacent to the uppermost horizOntal convolution of the heating element 86, as is shown in FIGS. 2, 4 and 7. The thermostat 92 is conventional and has the customary conductors 100 and 102 extending from the upper end thereof. As is well known, thermostats of this type can be adjusted by turning a screw 104 at the upper end of the thermostat.

A thermostat clip 106, FIGS. 4, 5 and 11, is made of stainless steel and is formed from a generally I-shaped blank or stamping S. The vertical portion 108 of the stamping is bent into a general U-shape with the curved portion thereof conforming closely to the shape of and extending partially around the heating element 86, as is best shown in FIG. 4. The upper horizontal end 110 and lower end 112 of the stamping are bent into a substantially cylindrical form with the extremities 111 of each further bent along lines 113 to extend substantially radially and spot welded together at 114, as is best shown in FIG. 5. The inside diameter of the cylindrical portions 110 and 112 conforms closely to the outside diameter of the housing of the thermostat 92, so that good thermal contact is established between the two. Tight clamping of the clip 106 on the thermostat 92 can to be assured by making the portions 110 and 112 slightly out-of-round and forcing the thermostat thereinto. As is shown in FIGS. 2 and 5, the cylindrical portion of the thermostat 92 extends through the portions 110 and 112 of the clip 106, thereby establishing two direct paths for conducting heat from the heating element 86 to the thermostat 92.

A similar thermostat 116 is mounted on the cover 43 and has conductors 118 and 120 connected thereto. This thermostat is set for a lower value than the thermostat 92, but preferably higher than the desired temperature in the cooking pot 4.

FIG. 6 schematically illustrates a wiring diagram including the electric motor 24 and pump 22, the flow-responsive switch 39, the heating element 86, and the two thermostats 92 and 116. It is to be understood that the circuit shown has been drawn to simplify explanation of the principles involved, and that customary relays, 3-phase current supply, etc., have been omitted as not essential to an understanding of the invention. Thus, electrical current is shown supplied to the circuit through leads 122 and 124 connected with a manually operated switch 126. The switch 126 is engageable with a contact 128 connected with the conductor 100 leading to the safety thermostat 92. The conductor 102, is shown for simplicity, connected with one terminal 130 of the heating coil 86, so that they in effect are in series. The other terminal 132 of the heating element 86 is connected with the conductor 118 of the thermostat 116, and the other conductor 120 is connected with a terminal 134 of the flow-responsive switch 39. A conductor 136 connects the other terminal 138 of the switch 39 with a terminal 140 that is engageable by the manual switch 126. Thus, it will be seen that the safety switch 39, thermostat 116, heating element 86 and thermostat 92, are all connected in series. Electrical current is supplied to the motor 24 by leads 142 and 144, connected with the conductors 100 and 136 respectively.

For present purposes, it is considered unnecessary to describe in detail the structure of the control valve 50 and the complete operating cycle of the deep fat fryer unit 2. U.S. Pat. No. 3,410,199, supra, may be referred to for such disclosure. Hence, the valve 50 can be assumed to be in an "OPERATE" position such that circulation of the cooking oil occurs from the cooking pot 4 to the heater tank 38 and then back to the cooking pot, as indicated by the arrows on FIG. 1. Thus, the pump 22 withdraws oil from the filter bowl 10 through the pipe 14 and fitting 16, and discharges the oil through the fitting 28 into the pipe 30, into the pipe 34, through the flow-responsive switch 39 and then into the heating tank 38.

Since the heating tank 38 is full of cooking oil, at all times when the unit is in operation, oil will be displaced from the heating tank 38 and returned to the cooking pot 4, through the tubes 44, at the same rate at which the pump 22 withdraws the oil from the cooking pot 4. In the normal operation, the thermostat 116 will control the supply of electrical current to the heating element 86 to maintain the cooking oil in the heater tank 38 at a desired temperature higher than the desired cooking temperature of the oil in the cooking pot 4.

Should the temperature in the cooking pot 4 drop below the desired temperature, as when frozen potatoes or other frozen foods are immersed in the cooking oil, the oil being delivered to the cooking pot 4 from the heating tank 38 will quickly restore the temperature in the cooking pot to the desired value; whereupon, the thermostat 116 will maintain the supply of current to the heating element 86, until the temperature of the oil in the heating tank regains its prescribed temperature. So long as cooking oil is being pumped through the pipe 34, the flow-responsive safety switch 39 will remain closed. However, if the flow should become obstructed, or in the event, that the system has been emptied and not refilled, the switch 39 will remain open and no current will be supplied to the heating element 86. Thus, the switch 39 is strategically located in the system to prevent operation of the unit when cooking oil is lacking or not being delivered to the heating tank 38.

As a further safety feature, and in the event that the switch 39 fails to function properly at a time when the system is empty, the heat developed by the heating element 86 will be directly conducted through the thermostat clip 106 to the safety thermostat 92, quickly heating the same and causing opening of the circuit to the heating element 86, to thereby discontinue the supply of electrical current to the heating element. This avoids the creation of a hazardous condition in which oil deposited on the heating element 86 would be vaporized in the heating tank 38, and discharge through the tubes 44 into the empty cooking pot 4.

The thermostats 92 and 116 can be set for any desired temperature, respectively, depending upon the cooking oil temperature desired in the cooking pot, the type of food to be cooked, etc.

FIGS. 7, 8 and 9 illustrate another embodiment of the thermostat clip 106A wherein a stamping similar to that previously described is used except that it has a longer U-shaped part 108A, which is made of sufficient length to provide space for a bolt 146 to positively clamp the thermostat clip to the heating element 86. The thermostat clip 106A further differs from that described above in that the horizontal portions 110A and 112B are circumferentially shorter in length so that when bent into a cylindrical shape they only partially surround the body of the thermostat, leaving a gap between their extremities. In this way, the horizontal portions 110A and 112B can be bent to a diameter that is slightly smaller than the outside diameter of the thermostat body so that the ends will have to be spread apart slightly in order to insert the thermostat therein. Such spreading will insure that the portions 110A and 112B will be tightly clamped throughout their length to the thermostat body.

FIG. 10 illustrates another embodiment of the thermostat clip 106B, which combines the U-shaped portion 108 of the thermostat clip shown in FIG. 5, with the split cylindrical portions 110A and 112B of the thermostat clip shown in FIG. 9. A feature of each embodiment of the thermostat clip is that it is tightly clamped into contact with both the heating element 86 and the thermostat 92 to insure sensitivity and rapid heat transfer from the heating element 86 to the thermostat.

It will be understood that various changes may be made in the design and construction of the thermostat clips disclosed herein and in the manner in which the thermostats are connected in the electrical circuit with the flow responsive switch 39 and the heating element 86, without departing from the principles of the invention or the scope of the annexed claims.

I claim:

1. In a deep fat fryer having a cooking pot, a pump, a heating tank for heating cooking oil, an electric heating element in said heating tank, and conduit means interconnecting said cooking pot, pump and heating tank and providing a circulating system for the cooking oil, the improvement comprising: a safety thermostat having a housing mounted vertically in said heating tank and extending to a point adjacent to said heating element; means connecting said thermostat in an electric circuit in series with said heating element; and metallic heat conducting means including one portion connected to said housing of said safety thermostat and another portion at substantially right angles thereto connected to said heating element to directly conduct heat from said heating element to said thermostat housing.

2. In a deep fat fryer having a cooking pot, a pump, a heating tank for heating cooking oil, an electric heating element in said heating tank, and conduit means interconnecting said cooking pot, pump and heating tank and providing a circulating system for the cooking oil, the improvement comprising: a flow-responsive switch arranged in the conduit means between said pump and said heating tank, said switch being connected in an electrical circuit in series with said heating element for interrupting the supply of electric current to said heating element in the absence of flow in said conduit means of cooking oil to said heating tank.

3. In a deep fat fryer as recited in claim 2, wherein the housing of a safety thermostat is mounted in the heating tank and extends vertically downward to a point adjacent to the heating element and is connected in the electrical circuit in series with said heating element, the further improvement comprising: metallic heat conducting means having one portion interconnecting said heating element with said thermostat housing and having another portion at substantially right angles thereto connected to said safety thermostat for directly conducting heat from said heating element to said thermostat housing.

4. A deep fat fryer as recited in claim 3, wherein the metallic heat conducting means is a resilient clip member; and wherein the clip member has a portion in contact with and extends at least partially around a convolution of said heating element and has a substantially cylindrical portion in contact with the thermostat housing.

5. A deep fat fryer as recited in claim 3, wherein the metallic heat conducting means has a generally U-shaped portion clamped around the heating element, and a substantially cylindrical portion extending from the end of one leg of said U-shaped portion clamped around the thermostat housing.

6. A deep fat fryer, comprising: a cooking pot, a pump, a heat exchanger for heating cooking oil including an electric heating element; conduit means interconnecting said cooking pot, pump and heat exchanger and providing a circulating system for the cooking oil; a normally open switch connected with the conduit means between said pump and said heat exchanger and being actuated to close by cooking oil being pumped to said heat exchanger; and means connecting said switch in an electrical circuit in series with said heating element for interrupting the supply of electrical current to said heating element in the absence of pumping of cooking oil to said heat exchanger.

* * * * *

UNITED STATES PATENT OFFICE
CERTIFICATE OF CORRECTION

Patent No. 3,688,683      Dated September 5, 1972

Inventor(s) Weldon C. Boggs

It is certified that error appears in the above-identified patent and that said Letters Patent are hereby corrected as shown below:

On the cover sheet insert -- [73] Assignee Food Research & Equipment Company, Tampa, Fla., a Corporation of Florida -- .

Signed and sealed this 20th day of March 1973.

(SEAL)
Attest:

EDWARD M. FLETCHER, JR.       ROBERT GOTTSCHALK
Attesting Officer      Commissioner of Patents

PO-1050
(5/69)

UNITED STATES PATENT OFFICE
CERTIFICATE OF CORRECTION

Patent No. 3,688,683          Dated September 5, 1972

Inventor(s) BOGGS, WELDON C.

It is certified that error appears in the above-identified patent and that said Letters Patent are hereby corrected as shown below:

Weldon C. Boggs, Tampa, Florida, assignor to Food Research & Equipment Co., Tampa, Florida, a corporation of Florida Signed and sealed this 15th day of May 1973.

(SEAL)
Attest:

EDWARD M. FLETCHER, JR.
Attesting Officer

ROBERT GOTTSCHALK
Commissioner of Patents